United States Patent [19]

Remontet

[11] 4,119,171
[45] Oct. 10, 1978

[54] SAFETY ANTI-THEFT DEVICE FOR VEHICLES HAVING A DIESEL ENGINE

[75] Inventor: Yves Remontet, Chatou, France

[73] Assignee: Societe d'Exploitation des Brevets Neiman SA., Courbevoie, France

[21] Appl. No.: 744,371

[22] Filed: Nov. 23, 1976

Related U.S. Application Data

[63] Continuation of Ser. No. 552,409, Feb. 24, 1975, abandoned.

[51] Int. Cl.² .............................................. B60R 25/04
[52] U.S. Cl. .................................... 180/114; 70/243; 70/252; 123/198 D; 307/10 AT; 340/64
[58] Field of Search .................. 180/114; 123/198 D, 123/198 B; 70/243, 252; 307/10 AT; 340/64

[56] References Cited

U.S. PATENT DOCUMENTS

| | | | |
|---|---|---|---|
| 1,000,523 | 8/1911 | Illsley | 180/114 |
| 3,021,913 | 2/1962 | Ouimet | 180/114 |
| 3,354,980 | 11/1967 | Nielsen | 123/198 B |
| 3,398,731 | 8/1968 | Johansson | 123/198 D |
| 3,680,656 | 8/1972 | Leger | 70/252 |
| 3,708,032 | 1/1973 | Suzuki | 70/252 |
| 3,782,493 | 1/1974 | Lipschutz | 180/14 |
| 3,797,287 | 5/1972 | Iba et al. | 70/252 |
| 3,855,828 | 9/1973 | Verderber | 70/243 |

*Primary Examiner*—John P. Silverstrim
*Attorney, Agent, or Firm*—Nolte & Nolte

[57] ABSTRACT

A safety device for a diesel engined vehicle comprises a key operated lock controlling starting and stopping of the engine and a steering wheel lock mechanism. The device is such that prevents the steering wheel from being locked while the engine is running.

4 Claims, 3 Drawing Figures

SAFETY ANTI-THEFT DEVICE FOR VEHICLES HAVING A DIESEL ENGINE

This is a continuation of Ser. No. 552,409, filed Feb. 24, 1975, now abandoned.

In French Pat. No. 2 044 039 of May 7, 1969 and in its two Additions Nos. 70/34 733 and 70/34 734 of Sept. 25, 1970, filed by the same Applicant, there were described safety devices applicable to anti-theft systems for vehicles driven by an internal combustion engine Diesel. It is known that these devices are special because there are no means for directly cuttung off, by means of the switch of the anti-theft device, an ignition circuit which does not exist. The engine driven by the starter only starts up under the control of the decompression or the control of the injection pump of the Diesel engine.

The safety problem to be solved was to prevent any incorrect action liable to permit the withdrawal of the key which would resist in the mechanical locking of a part essential to the operation of the vehicle (steering, gear change, clutch, etc.) while the vehicle is still being propelled by the engine and is therefore in motion, a situation presenting a very serious danger.

To meet this eventuality, the devices proposed have afforded solutions which have given satisfaction in the industry. There may be recalled the solutions consisting essentially in accordinating, on one hand, the control of the decompression of the engine or of the injection pump, and, on the other, the rotation of the anti-theft device, said control being governed by this rotation without the reverse case being possible, since it has appeared that the device controlling the decompression or the injection pump of the Diesel engine mechanically, electrically, hydraulically, or pneumatically could be defective and as a result, the stoppage of the engine which was essentially counted on, could possibly not occur.

The device according to the invention precludes the putting of the anti-theft device into the position for locking the steering (or a part essential to the operation of the vehicle) if, as a result of defective operation of the control or of an incorrect action, the engine does not stop.

According to the invention there is provided a device comprising an assembly of means for locking the rotation of the anti-theft device by precluding its return to the "OFF" position (and therefore the release of the bolt by withdrawal of the key) so long as the engine is running.

The device according to the invention employs under new and improved conditions, a bolt member which is normally biased by a spring to a position for locking the anti-theft device itself, which spring acts in opposition to the attraction of an electromagnet which is only energized if the following double condition is satisfied: engine stopped and anti-theft device not in the "OFF" position.

The rotor of the anti-theft device is locked by the abutment against the bolt member of a special cam integral with the rotor of the anti-theft device, said cam having a complex profile so as to be coordinated with the control of the decompression or with the control of the injection pump.

One embodiment of the device is illustrated in FIGS. 1, 2 and 3 of the single accompanying drawing in which the references of the various parts reproduce in part those of the aforementioned Patent and Additions, there being added new and different elements.

Figure 1:
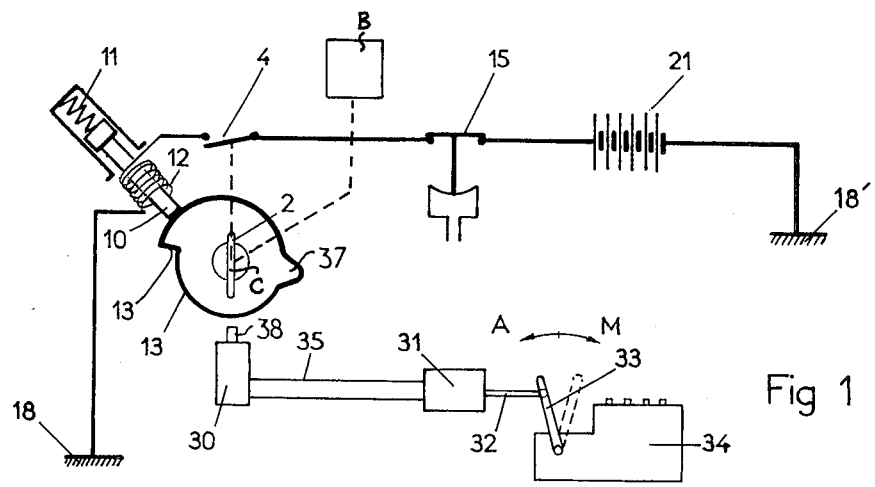
FIG. 1 shows the general diagram of the device in the "OFF" position.

In the drawings, the anti-theft device comprises a rotary lock, the axis of which is generally indicated at C and which comprises an electrical switch generally indicated at 4 and having a connection indicated in chain line to be movable with the lock. Additionally, a bolt element indicated generally at B is provided and is movable with the lock by means of the connection indicated in chain line. The bolt and its association with a part of the vehicle essential to the safe operation of the vehicle, such as, for example, the steering gear, is of any convenient and conventional form as, for example, that illustrated in commonly owned U.S. Pat. No. 3,782,493 issued January of 1974. The bolt per se forms no part of the pertinent invention and as such is illustrated only schematically herein.

Figure 2:
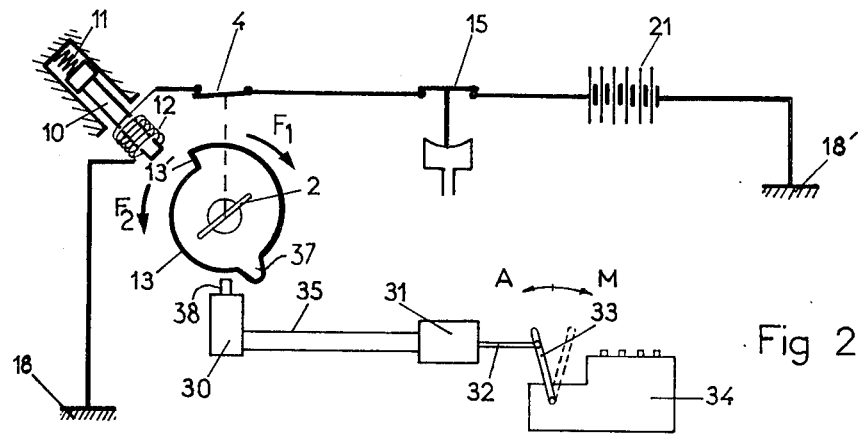
FIG. 2 shows the same diagram in the case of the return of the anti-theft device from the "ON" position to the "OFF" position, just after passage through the point of the piloting of the pump-stopping control in the case of a correct operation of this control.
Figure 3:
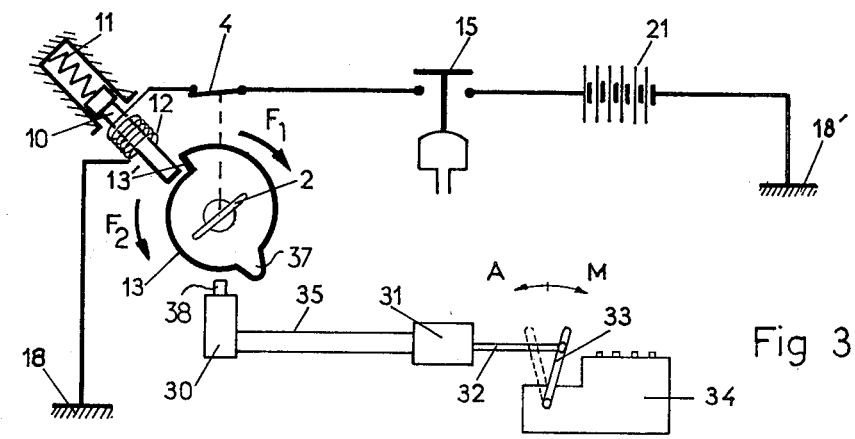
FIG. 3 shows the same position as in FIG. 2, but in the case of a defect in the control which has therefore failed to stop the engine.

In FIGS. 1, 2 and 3, there can be seen an operating element comprising a cam element 13 integral with the rotor of the anti-theft device and having a stop nose portion 13' and a boss 37 whose functions will be explained hereinafter. A member 10 constituting stop means, normally biased by a spring 11, bears against the edge of the cam 13 either in the "high" part of the cam or in the "low" part, the two parts being separated by the nose portion 13' constitutes a blocking surface cooperating with stop means 10.

An electromagnet 12 is supplied with current by the battery 21 through the oil pressure gauge contact 15 of the engine, which contact is closed when the engine is stopped, and through the switch 4 integral with the rotor of the anti-theft device (not shown).

The attraction of the electromagnet occurs when said circuit is closed and has for effect to raise the bolt member 10, by compressing the spring 11 and thus releases the cam 13 for rotation to the left (return to the "OFF" position).

The boss 37 is provided on the cam 13 to actuate through an appropriate linkage 35 in a positive manner a lever 33 controlling the injection pump through a follower comprising a push-member 38 of a pilot device 30 piloting the control 31 of the decompression valve or the injection pump 34. The injection pump and/or the decompressing valve constituting remote means effective to allow starting and stopping of the engine of the vehicle.

This control, starting with the pilot device 30, can be mechanical with the use of a rod or Bowden cable, electrical, pneumatic or hydraulic. The reference 35 represents therefore either the cable or the rod or the electric channel or hydraulic or pneumatic channel, said conductors being connected to a suitable supply network.

32 is preferably a simple link actuating the lever 33 of the pump or decompressor.

In FIGS. 2 and 3, the arrows $F_1$ represent the direction for reaching the "ON" position and the arrows $F_2$ the direction for reaching the "OFF" position of the anti-theft device.

The letters "A" and "M" represent respectively the "OFF" and "ON" positions of the injection pump or decompressor.

The operation of the device will now be described.

In the "OFF" position (FIG. 1), the engine is stopped, the switch 4 is open and the switch or switching means 15 of the pressure gauge contact is closed. As the electromagnet 12 is not supplied with current, the bolt member 10, biased by the spring 11, bears against the edge of the cam 13 in the "high" part thereof.

By turning the key to the right in the direction of arrow $F_1$, the anti-theft device is first unlocked, then the switch 4 is closed, which results in a supply of current to the electromagnet 12 and the bolt member 10 is attracted.

In continuing to turn the key, the following operations are brought about: the boss 37 acts in a positive manner on the pushmember 38 by depressing the latter which brings into action the piloting of the pump control 31 thereby causing the lever 33 to swing from the "OFF" position "A" to the "ON" position "M", resulting in the preheating, actuation of the starter and the starting up of the engine.

With the engine started up, the pressurizing of the air causes the opening of the switch 15 of the pressure gauge contact. As the electromagnet 12 is no longer energized, the bolt member 10 returns under the action of the spring 11 to the edge of the cam 13 in the low part thereof.

To stop the engine, the key 2 is turned in the opposite direction, namely in the direction of arrow $F_2$, to the piloting position by action of the boss 37 of the cam 13 on the pushmember 38.

Two cases must be envisaged:

1. The operation is correct, which case is shown in FIG. 2. The lever 33 is brought to the off position "A" which stops the engine and closes the switch 15 of the oil pressure gauge contact.

As the circuit of the electromagnet 12 is closed, the latter is energized and attracts the bolt member 10 which moves away from the cam 13 and allows the passage of the stop nose portion 13'.

The driver of the vehicle can then continue to turn the key of the anti-theft device to the "OFF" position which results in the opening of the contact 4 and therefore cuts off the supply of the electromagnet 12. The bolt member 10 biased by the spring 11 comes in contact with the edge of the cam 13 in the high part thereof and is thereby re-armed for operation in a new cycle.

2. The operation is incorrect owing to an incident in the pump stopping control. The lever 33 remains in the "ON" position as shown in FIG. 3 and the engine does not stop. The pressure gauge contact 15 remains open and, as the electromagnet 12 is no longer energized, the bolt member 10 remains on the edge of the cam 13 in the low part thereof and the nose portion 13' of the cam, in abutting against the bolt member 10, is ready to present any return of the anti-theft device in the direction of arrow $F_2$ and precludes the withdrawal of the bolt member for locking the steering (or any other part essential to the operation of the vehicle) and affords the required safety.

It will be understood that the nose portion 13' and the boss 37 are so positioned on the periphery of the cam 13 to bring about the described operations in perfect coordination with the positions of the switch 4 of the anti-theft device, the actuation of the starter and, possibly, the control of auxiliary circuits.

The position of the bolt member 10 with respect to the cam 13 is shown in the diagrams by way of example, it being understood that this bolt member may also have its axis of displacement perpendicular, or oblique, to the plane of the cam. Alernatively, the bolt member may be replaced by a bolt member which is driven in rotation to a position for precluding the movement of the anti-theft device.

I claim:

1. A safety device for a vehicle having a diesel combustion engine, said device comprising a key operated rotary lock comprising a rotor and a stator, a switch movable with the rotor of the lock, a bolt controlled by the lock and effective alternately to lock and to free a part of the vehicle necessary for its safe operation, said lock being movable sequentially from a first position in which said engine is stopped and said part of the vehicle is locked by said bolt, through an intermediate position in which said engine is stopped and said part of the vehicle is free of said bolt, to a third position in which said engine is running and said part of the vehicle remains free of said bolt; an operating element secured to and movable with said lock and comprising a cam element cooperating with a follower controlling a linkage to apply a controlling movement to remote means effective to allow starting and to stop said engine as said lock moves between said intermediate and third positions, a blocking surface formed on said cam element and cooperating with stop means movable between an operative position, in a path of movement of said blocking surface, in which said lock is prevented, by inter-engagement of said blocking surface and said stop means from being moved to said first position in which said bolt locks said part of the vehicle and an inoperative position in which said stop means is displaced from said path of movement of said blocking surface and the lock is freed to move to said first position to lock said part of the vehicle, means operable when the engine is running for maintaining said stop means in said operative position and means moving said stop means to said inoperative position when said engine is stopped and said lock is in said intermediate position.

2. A safety device as claimed in claim 1 wherein means as provided resiliently biasing said stop means into said operative position and electro-magnetic means is provided for moving said stop means into said inoperative position against the action of said means resiliently biasing said stop means.

3. A safety device as claimed in claim 2 wherein said electro-magnetic means is included in an electrical circuit having switching means responsive to a condition of said engine prevailing as said engine is running to interrupt said circuit and de-energize the electro-magnatic means.

4. A safety device as claimed in claim 3 wherein said switching means comprises an oil pressure gauge contact.

* * * * *